United States Patent [19]
Stanley

[11] 4,405,991
[45] Sep. 20, 1983

[54] KITCHEN CALCULATOR

[76] Inventor: Robert A. Stanley, 198 Sorauren Ave., Toronto, Ontario, Canada, M6R 2E9

[21] Appl. No.: 251,754

[22] Filed: Apr. 7, 1981

[51] Int. Cl.³ .................. G06F 15/20; H05B 6/66
[52] U.S. Cl. ........................ 364/715; 219/10.55 R
[58] Field of Search ............... 364/715, 477, 557; 219/10.55 R, 10.55 M

[56] References Cited

U.S. PATENT DOCUMENTS

| | | | |
|---|---|---|---|
| 3,932,723 | 1/1976 | Tamano et al. | 219/10.55 M |
| 4,255,639 | 3/1981 | Kawakata et al. | 219/10.55 B |
| 4,309,584 | 1/1982 | Terakami | 219/10.55 B |
| 4,323,773 | 4/1982 | Carpenter | 219/10.55 R |
| 4,356,370 | 10/1982 | Horinouchi | 219/10.55 B |

OTHER PUBLICATIONS

"Guide to Enjoying Your New Auto-Cook Microwave Oven", Litton Microwave Cooking No. 35788P01, Rev. 2, 1980, pp. 1-38.

Primary Examiner—David H. Malzahn

[57] ABSTRACT

The present invention provides an electronic handheld calculator for automatically calculating cooking times and cooking temperatures for various quantities of different foods. The calculator is provided with an input control system, which is used to designate different types and amounts of foods. As the inputs are entered, they are visually displayed on the calculator and are processed to provide a visually displayed output, comprising the time and temperature at which the food should be cooked for producing a desired degree of cooking.

10 Claims, 12 Drawing Figures

KITCHEN CALCULATOR

FIELD OF THE INVENTION

The present invention relates to a calculator for use in the kitchen for automatically calculating cooking times and cooking temperatures for various quantities of different kinds of foods.

BACKGROUND OF THE INVENTION

According to standard practice, persons cooking in the home estimate how long it will generally take to cook a roast, a turkey or the like. Most household cooks have their own system for determining the cooking time and the cooking temperature of the food. Typically, such systems are based on the weight of the food where the weight is broken into groups, for example, two or three pound groups. The cooking time and cooking temperature is then determined according to the number of poundage groups, e.g., one hour for every three to four pounds at a specified temperature.

These types of systems for calculating the cooking time and cooking temperatures become quite complicated when the poundage groups do not break down evenly; i.e. in the system given above, the calculations are difficult if the roast weighs, for example, eleven and a half pounds. The calculations become even more complicated when the weight of the food is given in something other than pounds, for example kilograms, where a conversion factor is required to convert the weight to pounds.

SUMMARY OF THE INVENTION

The present invention provides an electronic hand-held calculator for automatically calculating cooking times and cooking temperatures for various quantities of different foods, regardless of the units in which the food quantity is provided. The calculator includes a display region and is provided with an input control system comprising a first, second and third group of finger operable input controls. The members in the first and second groups are coordinated with one another in different pairings for food type designation. The members in the second and third groups are coordinated with one another for food quantity designation. Processing means is provided for processing all of the inputs to provide a cooking time at a cooking temperature output for producing a desired degree of cooking. The overall arrangement is one in which each input is automatically displayed at the display region as it is entered and after all of the inputs have been entered the output from the processing means is automatically displayed at the display region.

The calculator eliminates the need for any outside mathematical calculations, such as the conversion from kilograms to pounds thereby making it extremely efficient and easy to use in the kitchen to determine cooking times and temperatures of different types of foods.

BRIEF DISCUSSION OF THE DRAWINGS

The above as well as other advantages and features of the present invention will be described in greater detail according to the preferred embodiments of the present invention, wherein.

Figure 1:
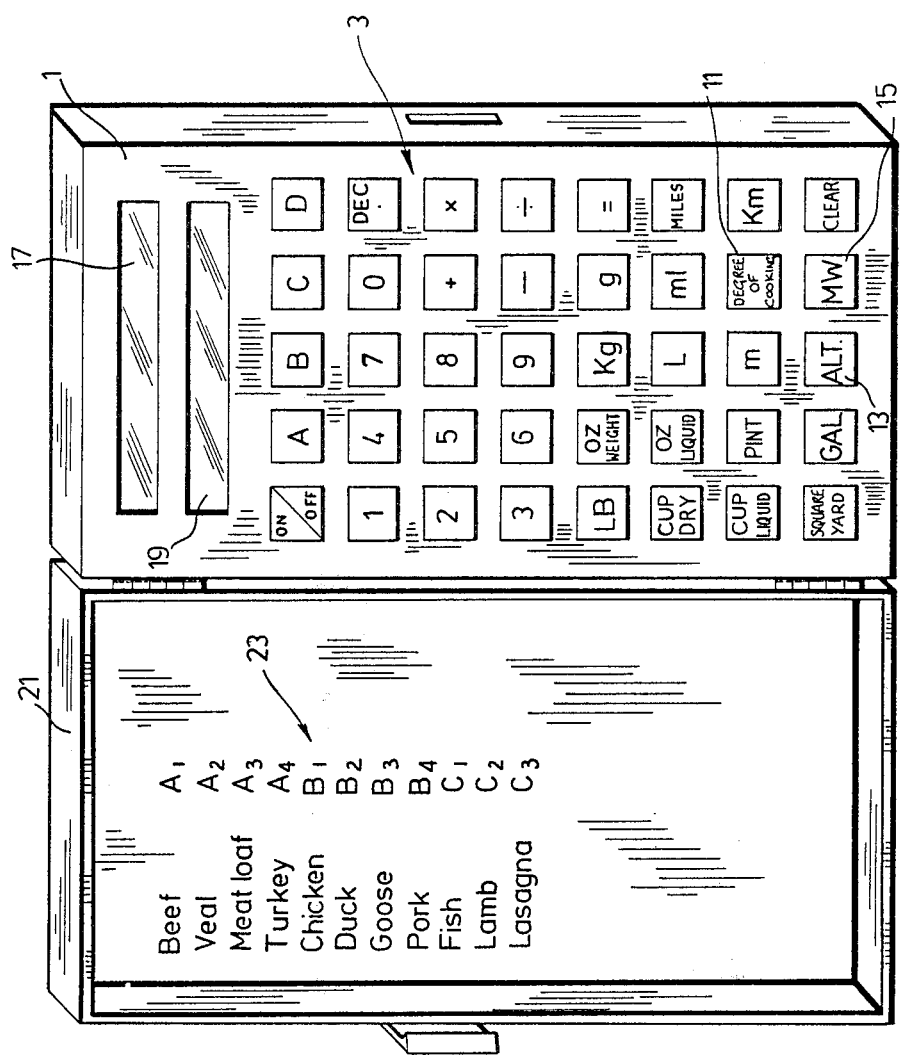
FIG. 1 is a front perspective view according to one embodiment of the present invention.
Figure 2:
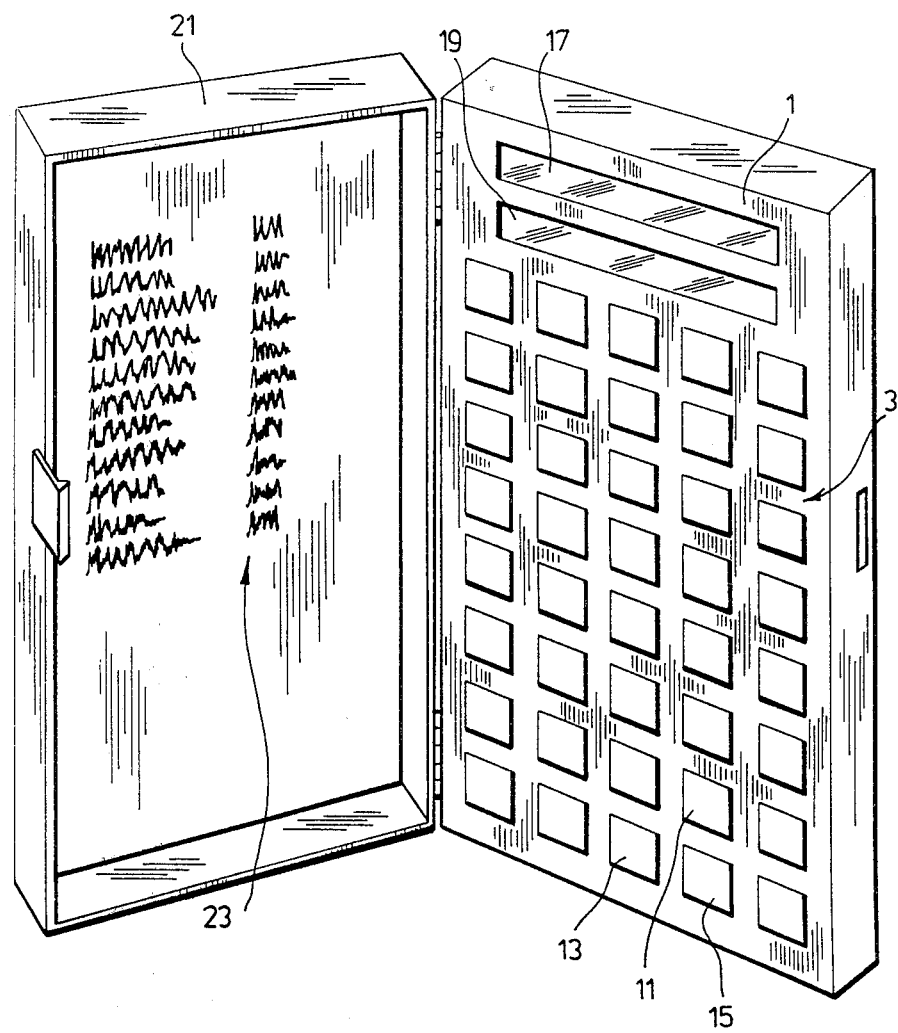
FIG. 2 is a perspective view looking down on the embodiment shown in FIG. 1.
Figure 3:
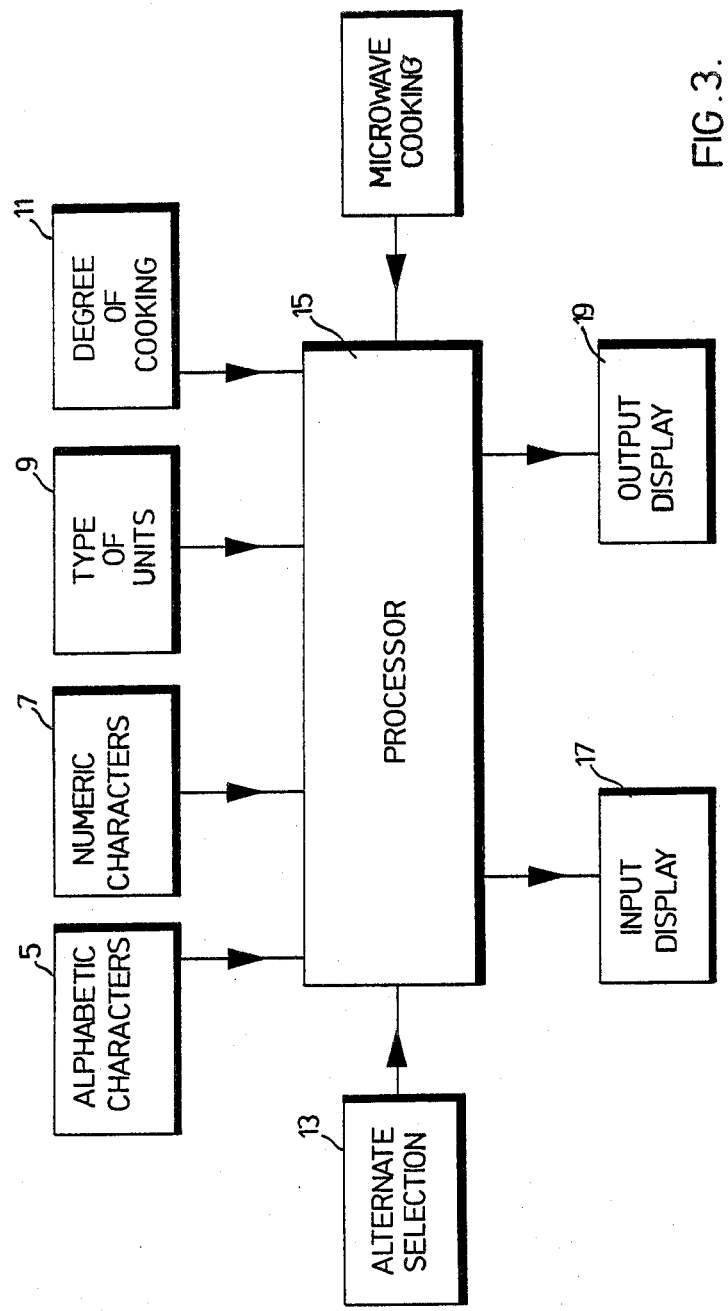
FIG. 3 is a plan view of a preferred interior component arrangement used in the calculator of FIGS. 1 and 2.

FIGS. 4a through 4c, 5a through 5c and 6a through 6c are schematic views of the display region of the calculator showing various operational steps in using the calculator of FIGS. 1 and 2.

DETAILED DESCRIPTION OF THE PREFERRED EMBODIMENTS

Calculator 1 shown in FIGS. 1 and 2 is provided on its forward face with an input control system generally shown at 3 in the form of a plurality of finger touch control buttons or keys divided into a number of distinct groups. The first group indicated at 5 comprises the members marked with alphabetic characters. The second group indicated at 7 comprises the members marked with numeric characters. The third group indicated at 9 comprises the members bearing type of food units characters; i.e., pounds, ounces, kilograms, cups, pints, liters, milliliters, grams and gallons.

The input control system is additionally provided with other input control members including degree of cooking button 11 and alternate selection button 13. Other buttons, such as those shown in the drawings, are added for increasing the versatility of the calculator where conversions other than those required for the cooking of food are required.

An input display 17 as well as an output display 19 are also provided on the forward face of the calculator. Each of these displays includes a plurality of LEDs for reproducing the input information and the output from the processor. Furthermore, the input and output information, according to the embodiment shown in the drawings, is alpha-numeric, so that the information shown at the input display corresponds with the information as it actually appears on the food packaging. For instance in the example shown in FIGS. 4 through 6 where a turkey of 9.32 kilograms is being cooked, the word "turkey" actually appears at the input display in combination with the numerical designation for 9.32 kilograms. This, of course, makes it extremely easy for the person in charge of the cooking to verify that he or she has entered the proper information into the calculator.

As will be appreciated a single display region can be used in substitution for the dual displays described above. The single display would be controlled to reproduce each input as it is entered and to automatically clear the inputs and enter the output from the processor after all of the inputs are entered.

The calculator is also provided with a cover 21 which, when closed, encases the body of the calculator to cover all of the input buttons as well as the two display areas. This is particularly important in view of the fact that the calculator is for use in the kitchen, where grease and cooking debris may otherwise build on and clog the forward face of the calculator where it would be difficult to clean. The cover, which is preferably made from molded plastics, is, on the other hand, extremely easy to clean and, when closed, prevents foreign matter from gathering on the control area of the calculator.

The inner face of cover 21 is provided with a chart 23 identifying the alpha-numeric designations for various food products. The chart may be covered by an easily cleaned transparent protective layer to enable easy reading of the chart.

As will be seen in FIG. 1, when the cover is open, the chart sits side-by-side with the input control system. This makes it extremely easy for entering the information from the chart into the calculator. Furthermore, the provision of the chart within the cover assures that the chart does not get lost and is always kept with the calculator.

Figures 4A, 4B, 4C, 5A, 5B, 5C, 6A, 6B, 6C:
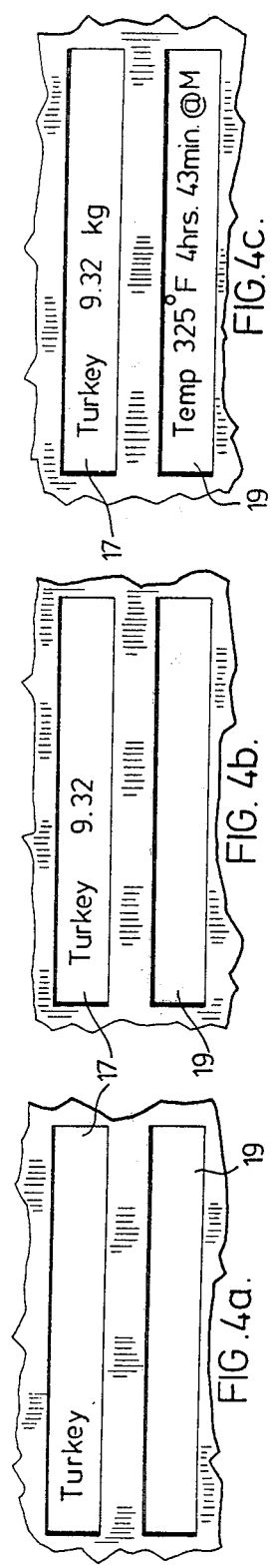

As mentioned above, each of the foods shown in the chart has an alpha-numeric designation; therefore, the alphabetic characters of group 5, as well as the numeric characters of group 7, cooperate with one another for designating the various types of foods. In addition, the numeric characters of group 7 cooperate with the type of unit characters in group 9 for designating the amount of food. Accordingly, the input system works as shown in FIGS. 4a through 4c. By pushing the buttons A and 4, the word "turkey" appears at the input display. The numeric buttons 932 with the appropriately placed decimal are then punched into the calculator. Finally, the kilogram button from group 9 is punched to complete the input information. It will be noted in FIGS. 4a and 4b that the output display does not show any information and it is only in FIGS. 4c, where all of the input information has been punched into the calculator, that the processor provides an output at output display 19. Furthermore, the input information is maintained at the input display so that the input and output appear simultaneously with one another, so that the person using the calculator can visually verify that he or she has entered the information correctly and has received the correct output based on properly entered input information.

The processor itself is arranged to coordinate all the information as it is entered into the calculator and to automatically provide an output only after all the required input information has been entered. It should be noted that there is no need to push any additional buttons to make the output appear at the output display.

It will be seen in FIG. 4c that the temperature and cooking time are shown for medium cooking, which is the degree of cooking normally requested. However, in some instances, it will be desired to have the food cooked to either a rare or a well-done condition, in which case the output from the processor will vary from that shown in FIG. 4c. The selection of the degree of cooking is made by depressing button 11; for example, once for rare cooking and twice for well-done cooking. Without depressing the button, medium cooking output will automatically appear at the output display. However FIG. 6c shows the designation WD representative of an output for well-done cooking. Here it will be seen that the temperature portion of the output is consistent with that of FIG. 4c, but the time portion has been increased in FIG. 6c, so that the turkey is cooked for a longer period of time for further cooking. As will be appreciated, if the degree of cooking button is used to provide an output for rare cooking, the letter R will appear at the output display and the time and/or temperature will be appropriately decreased from that shown in FIG. 4c.

In some instances, it may not be practical to use the information initially displayed at the output display. For example, if one wishes to eat within about four hours, the turkey cannot be cooked according to the conditions shown in FIG. 4c. In this case, alternate button 13 will be used to provide alternate cooking condition outputs for the same degree of cooking. For example, the output of FIG. 5c is arrived at by pushing the alternate button, where medium cooking is still produced but at an increased temperature for shorter periods of time than that shown in FIG. 4c. The processor may be adapted to have other alternate selections, some of which could obviously provide for longer cooking times at lower temperatures, should this be desired.

Another selection which is made according to this preferred embodiment, is that of microwave as opposed to conventional oven cooking. Unless selected for microwave cooking, the results appearing at the output display relate to standard oven cooking. However by pressing button 15, the output information will relate to microwave cooking.

As will be seen in FIG. 1, the calculator has the standard required on/off and clear buttons. In addition, it is provided with various other food related buttons, such as cup dry, cup liquid, pint, gallon, liter and milliliter buttons. These, of course, are also useful in the kitchen. The buttons, such as miles and square yards, will more than likely be used outside of the kitchen.

Referring again to FIGS. 4 through 6, it will be seen that the weight of the turkey is given in kilograms, a metric measurement of the weight of the turkey. In the past people have been used to the weight in terms of pounds and ounces and when the weight is given in kilograms, it presents problems to persons used to non-metric measurements for conversion of the kilograms back to pounds and ounces. However according to the present invention, there is no need to make such a conversion and the desired output is produced by simply pushing the kilogram button in combination with the other input information. On the other hand, where non-metric weights are given; i.e., where the weight of the food product is in pounds and ounces, the appropriate output is provided by simply pushing the pounds and ounces keys.

In cases where it is desired to make the straight conversion from metric to non-metric units, the calculator can be used in a standard manner and is accordingly provided with conventional addition, subtraction, multiplication, division and equals buttons.

As has been described above, the present invention provides a calculator which is particularly suitable for use in the kitchen and which accurately provides appropriate cooking times and cooking temperatures for various different kinds and amounts of food products. Furthermore, although various preferred embodiments of the invention have been described herein in detail, it will be appreciated by those skilled in the art that variations may be made thereto without departing from the spirit of the invention or the scope of the appended claims.

The embodiments of the invention in which an exclusive property of privilege is claimed are defined as follows:

1. An electronic hand held calculator for automatically calculating cooking times and cooking temperatures for various quantities of different foods, said calculator having an input control system comprising a first, a second and a third group of finger operable input control members, processing means adapted to receive a first input from members in said first and second groups for designation of food type and to receive a second input from members in said second and third groups for designation of food quantity and to process said first and second inputs to provide cooking time at a cooking temperature output information for producing a desired degree of cooking and display means for receiving and displaying said first and second inputs as they are entered and for thereafter displaying such output information.

2. An electronic handheld calculator as claimed in claim 1 wherein said display means comprises an input and an output display, the arrangement being one in which each input remains at the input display until cleared from the calculator with the output information displayed at the output display being simultaneously with the displayed inputs.

3. An electronic handheld calculator as claimed in claim 2, wherein said input display is alpha-numeric for reproducing input information as found on packaging of the food for easing visual comparison and verification of said first and second inputs and said output information.

4. An electronic handheld calculator as claimed in claim 1, wherein said input control system includes a finger operable alternate temperature and time selector for providing alternate cooking time at cooking temperature output information from said processing means to arrive at substantially the same degree of cooking.

5. An electronic handheld calculator as claimed in claim 1, wherein said input control system includes a finger operable degree of cooking selector which is operated to vary the output from said processing means.

6. A calculator as claimed in claim 5, wherein said degree of cooking selector is normally set at medium cooking and which is adjustable to both rare and well-done cooking and is coordinated with said processing means to provide outputs relating to rare, medium and well-done cooking in accordance with said degree of cooking selector.

7. A calculator as claimed in claim 1, wherein said second group of input control members designate number of food units and said third group of input control members designate type of food units.

8. An electronic handheld calculator as claimed in claim 1, wherein said input control system and said display means are provided on a face of said calculator, said calculator being provided with a protective cover for covering said face of said calculator when not in use, said protective cover being adapted to open outwardly side-by-side with said face and being provided interiorly with a guide chart for operating said input control system adjacent said input control system when said cover is open.

9. An electronic handheld calculator as claimed in claim 1, wherein said input control system is provided with a selector for microwave cooking.

10. An electronic handheld calculator as claimed in claim 9, wherein said processing means is adapted to normally provide the output information in relation to conventional oven cooking and to provide the output information in terms of microwave cooking when selected through said selector for microwave cooking.

* * * * *